Jan. 26, 1971  B. W. AVERY  3,557,574
SPIRAL TOOTHED COUPLING
Filed Nov. 25, 1968  3 Sheets-Sheet 3
Fig_5_
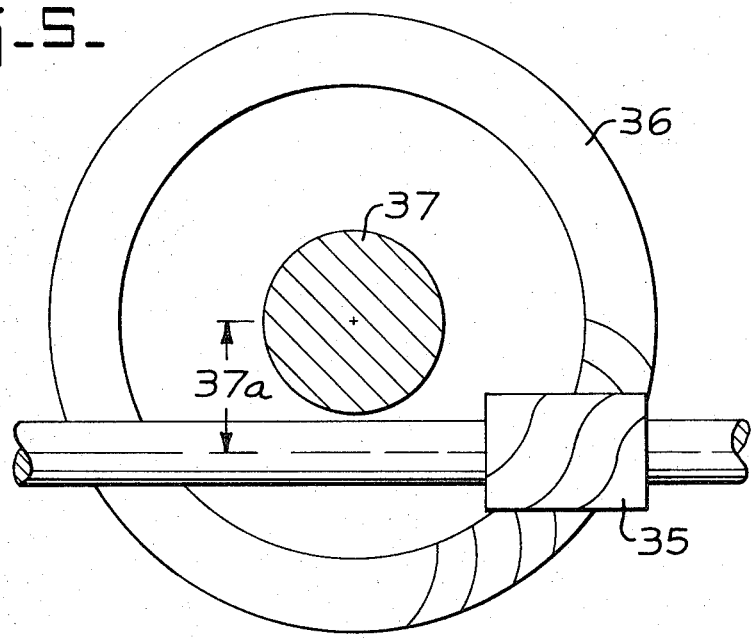
Fig_6_
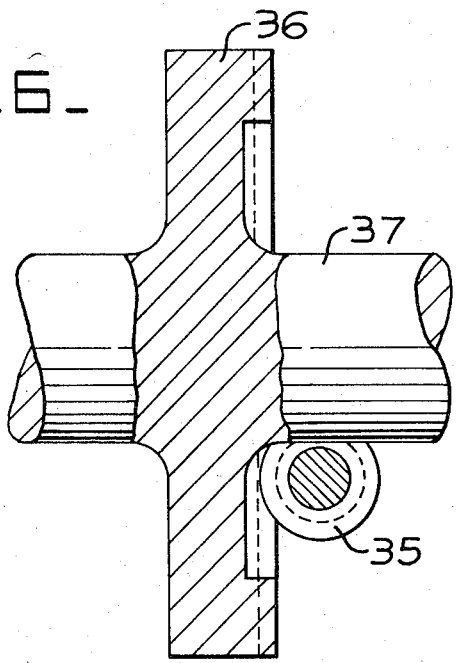
INVENTORS
BENNETT W. AVERY
BRUCE W. KELLEY
BY
ATTORNEYS

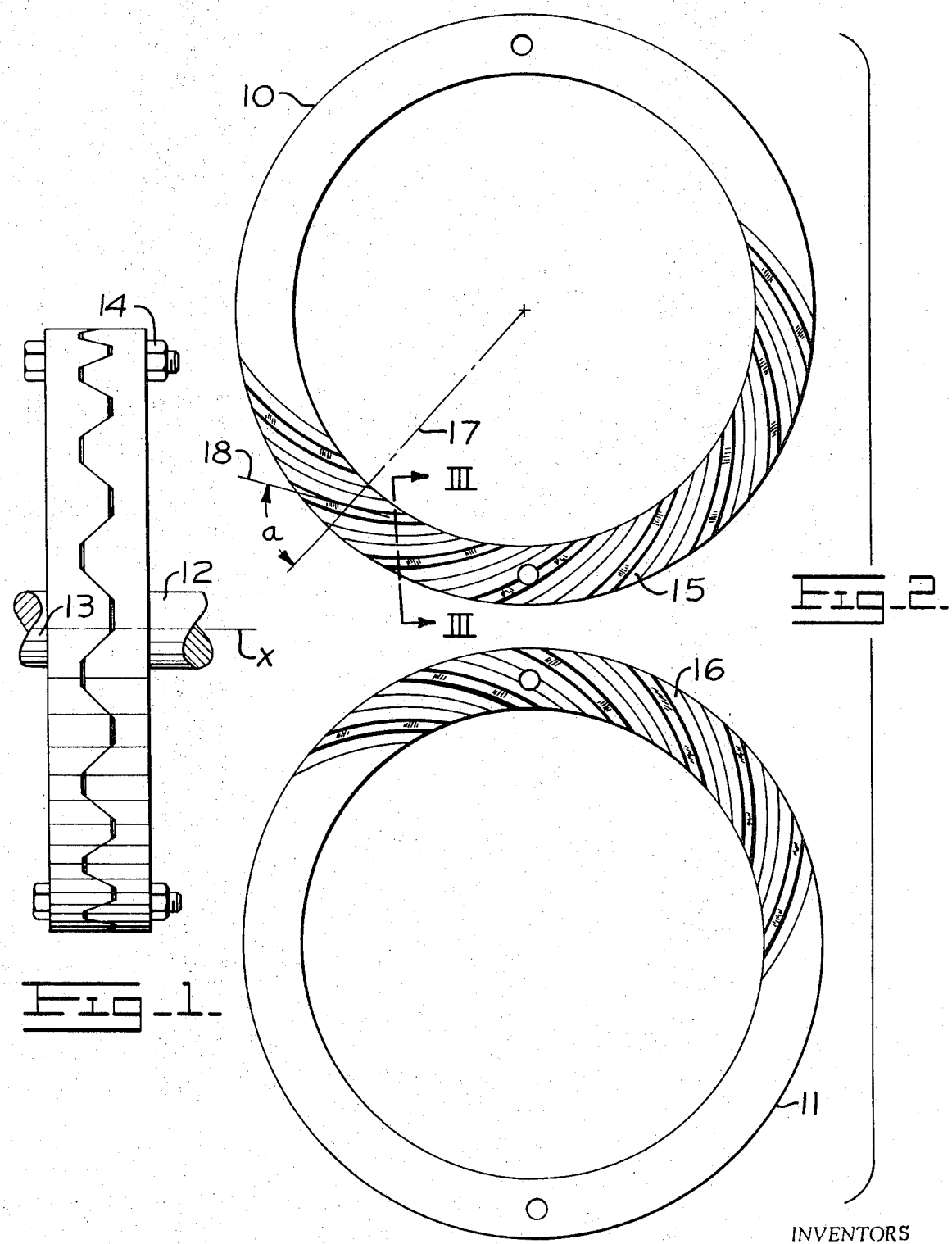

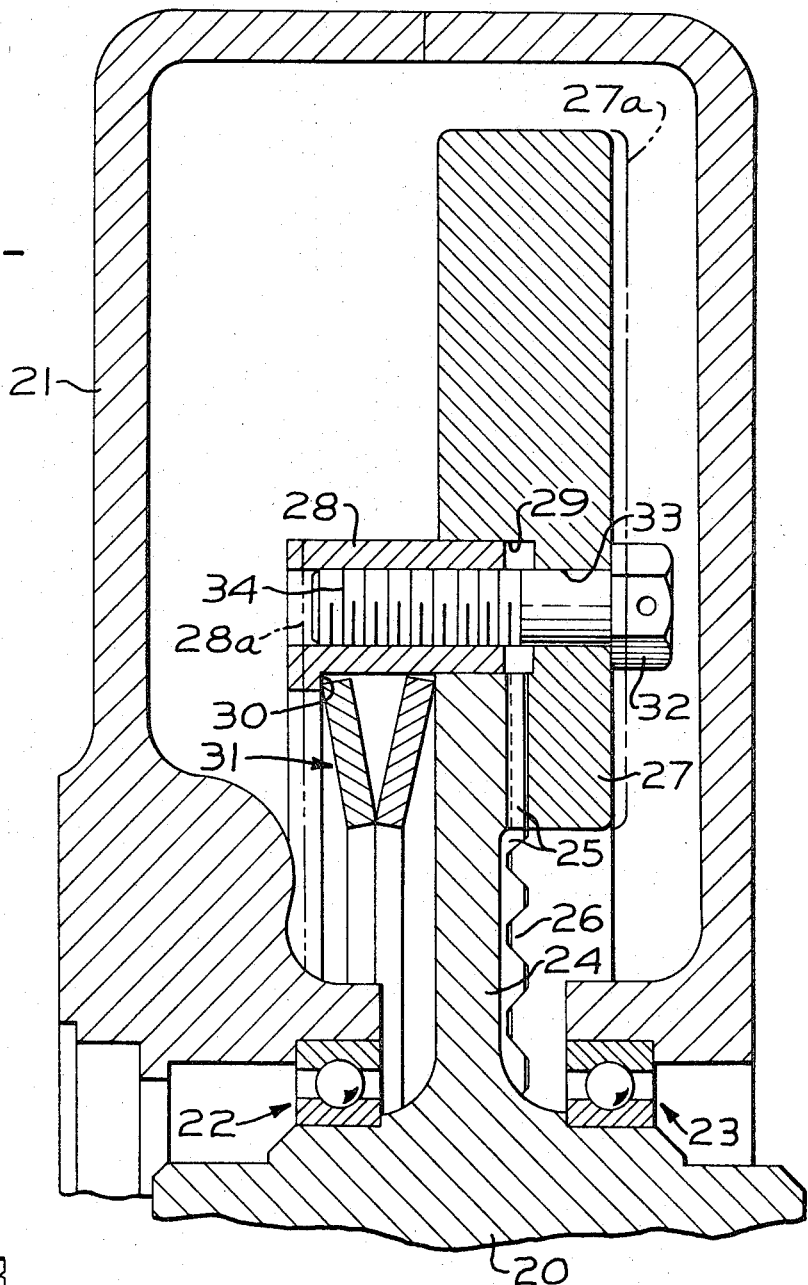
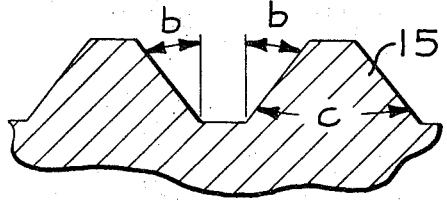

3,557,574
SPIRAL TOOTHED COUPLING
Bennett W. Avery, Peoria, and Bruce W. Kelley, Washington, Ill., assignors to Caterpillar Tractor Co., Peoria, Ill., a corporation of California
Filed Nov. 25, 1968, Ser. No. 778,594
Int. Cl. F16d 7/04
U.S. Cl. 64—28
17 Claims

ABSTRACT OF THE DISCLOSURE

A coupling comprises two juxtaposed face gears having spiral teeth of opposite hand formed thereon to fully mesh with each other. The coupling is adapted for use as a fixed coupling by securing the two gears together, an axially engaging clutch by selectively moving the two gears into engagement or a torque limiting device by employing means for controlling tooth separation when torque loads imposed thereon exceed a predetermined amount.

Conventional couplings of the axially engaging type are oftentimes complex and unduly expensive to manufacture. In addition, the methods of manufacture normally employed for conventional face couplings preclude the incorporation of hubs or shafts which protrude beyond the surface of the toothed areas of the coupling members.

An object of this invention is to overcome the above problems by providing a non-complex and inexpensive coupling which is adapted for expeditious manufacture and assembly. In addition, the coupling comprises juxtaposed gears each having spiral teeth formed thereon to substantially mesh with each other to assure efficient coupling operation and to afford a high degree of structural integrity. The coupling is adapted for use as a fixed coupling, an axially engaging clutch, or a torque limiting device. In the preferred embodiment, the coupling comprises juxtaposed face gears having spiral teeth of opposite hand formed thereon.

Other objects of this invention will be understood from the following description and accompanying drawings wherein:

FIG. 1 is a front elevational view of a coupling;

FIG. 2 is a plan view of two face gears comprising the coupling of FIG. 1;

FIG. 3 is a sectional view taken on line III—III in FIG. 2;

FIG. 4 is a half cross-sectional view of a torque limiting device employing the coupling principles of this invention therein; and FIGS. 5 and 6 are views showing a hob and face gear during the cutting operation.

Referring to FIG. 1, a coupling comprises juxtaposed and vertically disposed face gears 10 and 11 splined or otherwise suitably secured to shafts or power input and output means 12 and 13, respectively. The face gears and shafts may be suitably mounted by spaced bearing means (not shown) to rotate about a common longitudinal axis $x$. In the embodiment illustrated, bolts 14 are utilized to secure the gears together to form a fixed coupling to transmit power therebetween.

For example, the fixed coupling principles herein described could be used for connecting two juxtaposed rotors of a gas turbine engine together. Other applications for such a fixed coupling could comprise the attachment of a turbine or compressor rotor to a shaft, the securance of one or more gears to a shaft or the attachment of sections of a crankshaft of an internal combustion engine together.

Referring to FIGS. 2 and 3, a left-hand set of spiral teeth 15 of the convex-concave type formed in circular pattern on face gear 10 to mesh with similar right-hand spiral teeth 16 formed on face gear 11. The tooth's mean spiral angle $a$, is designated as the included angle between the intersection of a radius line 17 and a line 18 tangent to the convex side of the tooth. Such angle is preferably selected from the range of from 20° to 80° and is shown in FIG. 2 as approximately 45°.

Referring to FIG. 3, each tooth comprises first and second converging and substantially flat faces preferably forming equal pressure angles $b$ to assure intimate meshing of the teeth.

The included angle $c$ between such faces is preferably selected from a range of from 30° to 90° with the included angle as shown approximating 50°. Spiral teeth 16 of face gear 11 are formed in an identical manner to teeth 15, except that former teeth constitute an opposite or right-hand pattern. It should be appreciated that one skilled in the art could apply these principles to face gears with relatively low cone angles, or by tilting the hob relative to the face gear during the cutting operation. Further, two or more face gears 10 could be coupled to a single face gear 11.

The remaining gear parameters may be selected pursuant to conventional gear design principles. For example, teeth 15 and 16 preferably have equal face widths. In addition, the teeth preferably have appropriate tip to root clearance to thus exhibit a snug nesting relationship between the meshing teeth.

Teeth 15 and 16 may be expeditiously formed on their respective face gears by conventional and relatively inexpensive hobbing techniques. Such hobbing techniques are very fast since a plurality of teeth are cut simultaneously. The hob may be identical to a conventional gear cutting hob but must be of the appropriate hand for the member to be cut. The hob teeth are preferably straight sided and of equal pressure angle on both sides. The hob is normally located on a hobbing machine to form plunge cuts defining the spiral teeth in a conjugate manner. Referring to FIGS. 5 and 6 the hob 35 is normally positioned in an appropriate quadrant of the face gear 36. The selection of the quadrant depends mainly upon convenience of arrangement for the hobbing machine and the hand being cut. It is apparent that the axis of the hob normally does not intersect the axis of the face gear. This offset 37a of the cutter axis from the face gear axis permits incorporating with the face gear 36 an integral hub or shaft 37 that may protrude beyond the surface of the spiral teeth. Coupling members 24 and 27 of FIG. 4 are examples of the flexibility of design this feature permits. The offset may be varied within wide limits with appropriate variances in hob lead, included angle $c$ and cutter to face gear ratio, as desired for a particular coupling application.

The face gears may be formed as in integral part of their respective shafts 12 and 13, as a part of other supporting members or as individual parts. In addition to hobbing, other methods such as shell molding, die casting or powdered metallurgy may be utilized to form the gear teeth. However, the hobbying process is normally preferred for high-speed operations wherein close tolerances and high degrees of durability and structural integrity are required.

When the above described coupling is employed as an axially engaging clutch attaching means such as bolts 14 would be removed. The face gears could be slidably mounted on their respective shafts 12 and 13 or other supporting members by suitable spline connections or the like. Suitable means (not shown) could be employed for moving one or both of the face gears axially for selective clutch engagement or disengagement purposes.

FIG. 4 illustrates a torque limiting device utilizing the coupling principles above-described. A shaft 20 is mounted for rotation about a longitudinal axis thereof within a housing 21 by spaced bearing means 22 and 23. The shaft has a radially projecting flange 24 secured thereto which may be similar in construction to face gear 11 of FIGS. 1 and 2. In particular, spiral teeth 25 are formed in a circular pattern therearound to mesh with spiral teeth 26 of an opposite hand formed on a radially disposed flywheel 27.

Torque limiting means for permitting temporary tooth disengagement and ratcheting comprises an annular retaining collar 28 reciprocally mounted on flange 24 and in a mating annular groove 29 formed in the flywheel. The flange functions to aid in guiding axial movements of gear 26 and flywheel 27 upon tooth separation. An annular flange 30 is formed on collar 28 to retain spring means 31, preferably comprising back-to-back Belleville springs, of the torque limiting means along with flange 24.

The spring means is thus operatively connected between the gears for normally biasing the teeth thereof into meshing relationship. A plurality of radially disposed bolts 32 (one shown) are slidably mounted in mating bores 33 formed in the flywheel and threadably attached at 34 to collar 28. The bolts thus provide adjusting means for presetting the compression of spring means 31 to selectively vary the amount of flywheel inertia required to permit coupling ratcheting.

In operation, shaft 20 may be driven by a conventional internal combustion engine or the like to rotate flywheel 27 via the meshing spiral threads of gears 25 and 26. Should the shaft stall, for example, flywheel inertia may exceed a predetermined amount to cause tooth separation in opposition to the tooth engaging force of spring means 31. The flywheel and collar will thus move to the dotted line positions 27a and 28a, respectively, to allow the flywheel to slip or ratchet.

When such inertia falls below such amount the teeth will re-engage under the influence of spring means 31. Such slipping or ratcheting is a direct function of angle $c$ (FIG. 3) as well as other tooth design parameters and the amount of pre-adjustment made to bolts 32. For example, tightening of the bolts will raise the amount of flywheel inertia required for ratcheting purposes.

What is claimed is:

1. A coupling comprising
    a first face-type gear having a first set of spiral teeth forming a circular pattern thereon, and
    a second face-type gear having a second set of spiral teeth forming a circular pattern thereon, the teeth of each of said first and second face-type gears following a spiral pattern essentially in the face plane of a respective gear and said gears normally disposed in juxtaposed relationship to substantially fully mesh the first and second sets of spiral teeth together, the teeth of said first and second sets of teeth having equal and opposite spiral angles at the points of mesh, each tooth of each set of teeth being of the convex-concave type with the spiral angle for each tooth being selected from the range of from 20° to 80°.

2. The invention of claim 1 wherein each of said first and second gears constitutes a face gear and said first and second sets of teeth are formed on opposing faces of said gears and have opposite hands.

3. The invention of claim 1 wherein each tooth of said first and second sets of teeth comprises first and second converging and substantially flat faces forming equal pressure angles, the included angle between said teeth selected from a range of from 30° to 90°.

4. The invention of claim 1 wherein the teeth of said first and second sets of teeth have equal face widths.

5. The invention of claim 1 wherein said teeth are formed with suitable tip to root clearances to assure a snug nesting relationship between the meshing teeth.

6. The invention of claim 1 wherein said first and second gears are mounted for rotation about a common longitudinal axis, said first gear non-rotatably attached to a power input means and said second gear non-rotatably attached to a power output means.

7. The invention of claim 6 further comprising means for securing said first and second gears together to positively retain the respective first and second sets of teeth thereof in meshing relationship to form a fixed coupling.

8. The invention of claim 6 wherein each of said power input and output means comprises a shaft mounted for rotation about said common longitudinal axis.

9. The invention of claim 6 wherein said coupling constitutes a clutch with at least one of said first and second gears slidably mounted on its respective power input or output means for effecting selective engagement or disengagement of said first and second sets of teeth.

10. The invention of claim 1 wherein each of said first and second gears constitutes a face gear mounted for rotation about a common longitudinal axis, said first and second sets of teeth formed on opposing faces of said gears and having opposite hands.

11. The invention of claim 10 wherein said first and second gears are attached together to positively retain the respective sets of teeth thereof in meshing relationship to form a fixed coupling.

12. The invention of claim 10 wherein at least one of said first and second gears are mounted for axial movement along said longitudinal axis for selectively engaging or disengaging the sets of teeth thereof to effect an axially engageable clutch.

13. The invention of claim 10 wherein said first gear is attached to a flywheel radially disposed relative to said longitudinal axis and said second gear is attached to a shaft mounted for rotation about said longitudinal axis and further comprising torque limiting means operatively associated with said first and second gears for normally urging said first and second sets of teeth into meshing relationship and for permitting at least partial disengagement and ratcheting thereof when the inertia of said flywheel exceeds a predetermined amount when said shaft and attached flywheel are rotated.

14. The invention of claim 13 further comprising a housing arranged to enclose said coupling and flywheel and bearing means rotatably mounting said shaft in said housing.

15. The invention of claim 13 wherein said torque limiting means comprises spring means operatively connected between said first and second gears for normally biasing the sets of teeth of said gears into meshing relationship.

16. The invention of claim 13 wherein said torque limiting means comprises means for guiding axial movements of said first gear and flywheel when they are moved relative to said first gear in the direction of said longitudinal axis.

17. The invention of claim 13 wherein said torque limiting means comprises adjusting means operatively connected to said first and second gears to selectively vary the amount of flywheel inertia required to permit at least partial disengagement and ratcheting of said first and second sets of teeth.

References Cited
UNITED STATES PATENTS

| | | | |
|---|---|---|---|
| 2,366,502 | 1/1945 | Gerald | 64—27X |
| 2,398,570 | 4/1946 | Wildhaber | 192—67 |
| 2,431,785 | 12/1947 | Wildhaber | 192—67 |
| 2,464,590 | 3/1949 | Landahl | 192—56 |
| 2,597,140 | 5/1952 | Versnel | 192—56X |
| 2,914,929 | 12/1959 | Irons | 64—9 |
| 2,942,381 | 6/1960 | Gilbert | 64—28X |

JAMES A. WONG, Primary Examiner

U.S. Cl. X.R.

64—9; 192—56, 67, 150